Feb. 28, 1939.                L. A. DOWD                2,149,165
                      PORTABLE TAKE-DOWN STRUCTURE
                        Filed July 8, 1935          4 Sheets—Sheet 1
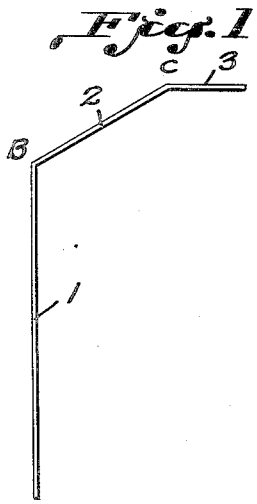
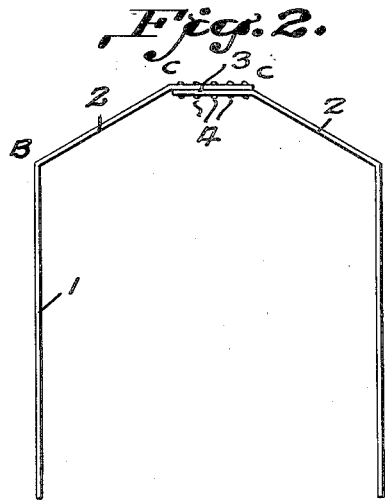
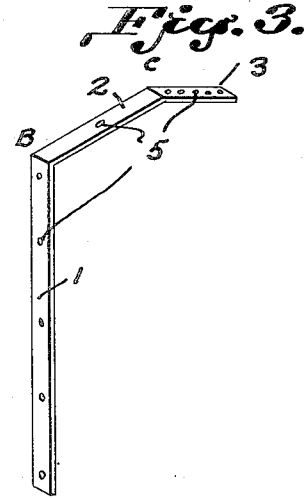
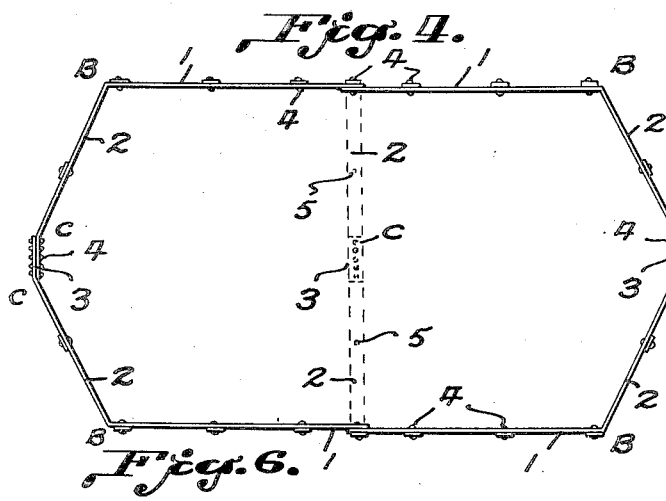
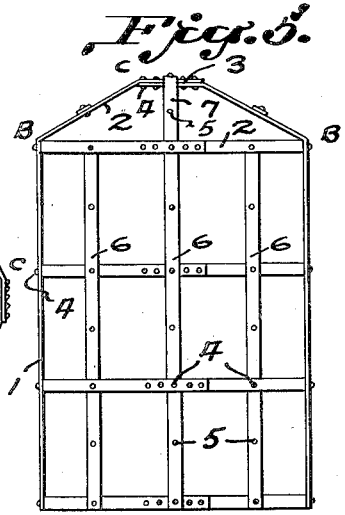
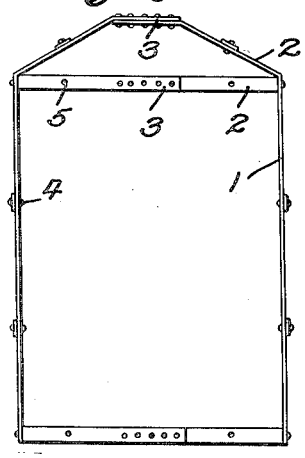
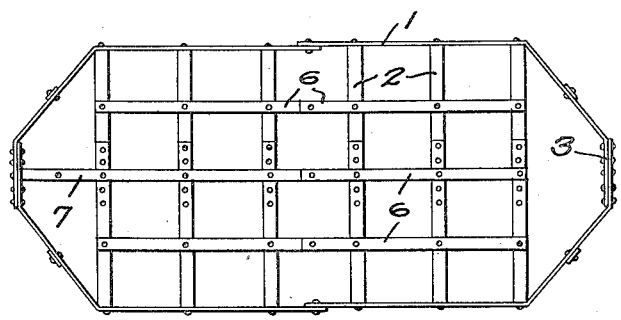
INVENTOR
Lewis A. Dowd.

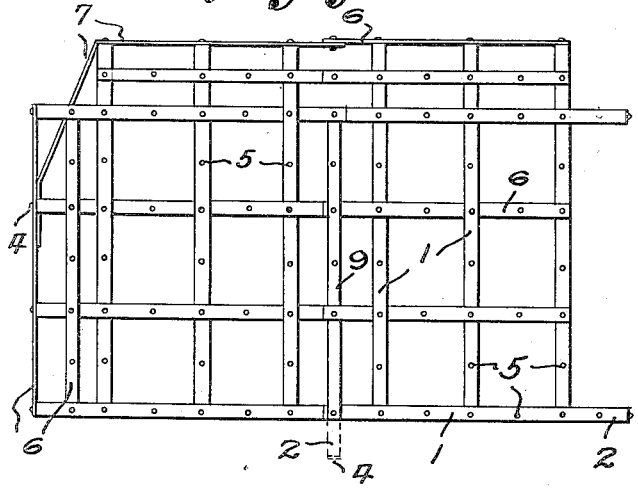
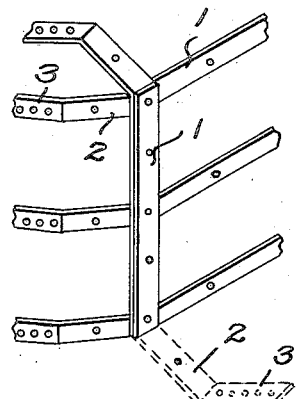
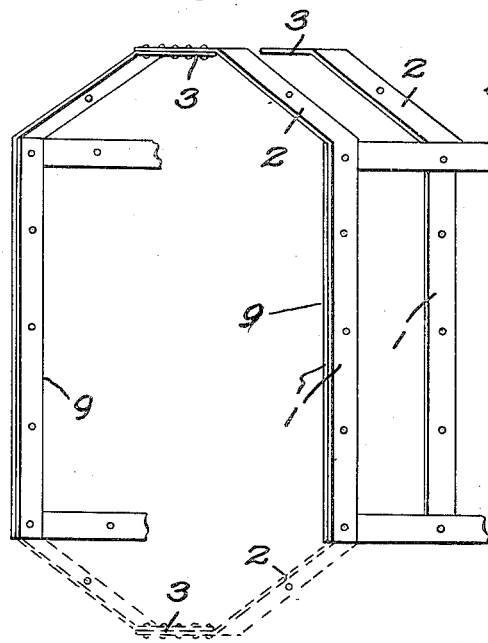
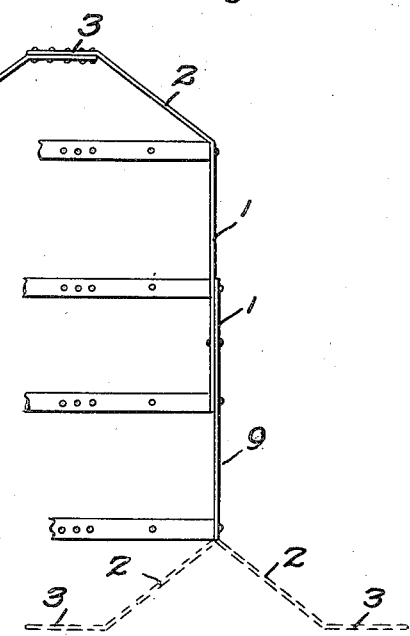

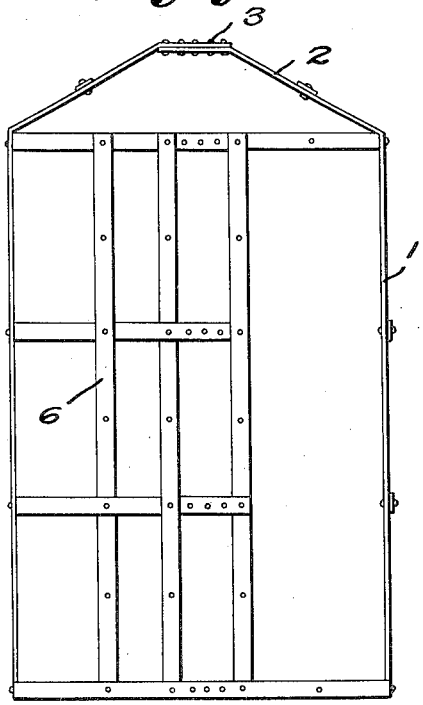
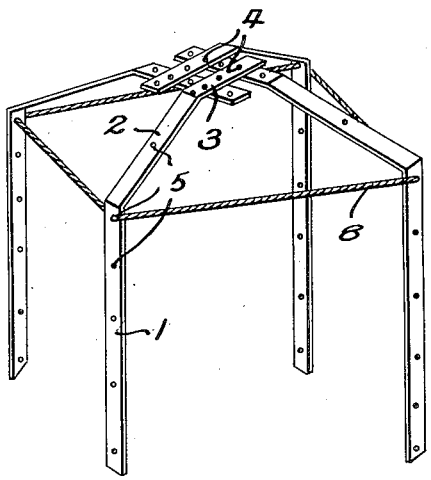
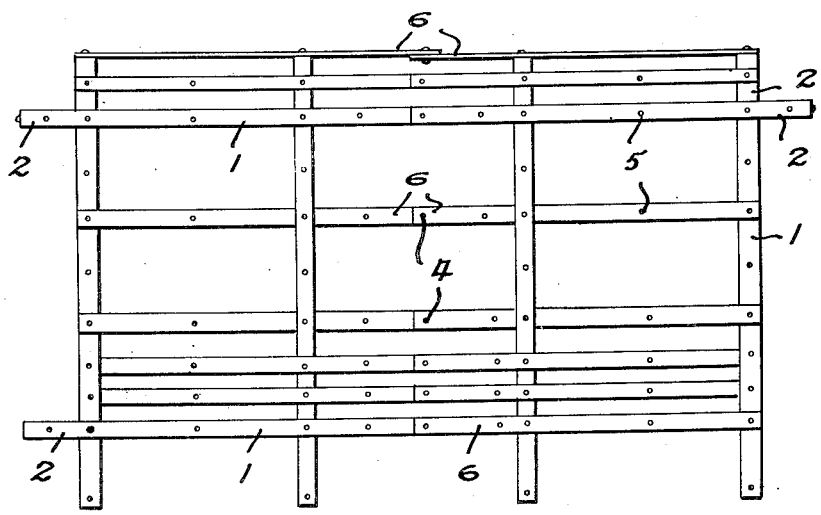

Feb. 28, 1939.  L. A. DOWD  2,149,165
PORTABLE TAKE-DOWN STRUCTURE
Filed July 8, 1935  4 Sheets-Sheet 4

INVENTOR
Lewis A. Dowd.

Patented Feb. 28, 1939

2,149,165

UNITED STATES PATENT OFFICE 2,149,165

PORTABLE TAKE-DOWN STRUCTURE

Lewis Alfred Dowd, Boston, Mass.

Application July 8, 1935, Serial No. 30,253

11 Claims. (Cl. 135—3)

This invention relates to a variety of useful portable takedown structures of genuine value and convenience and is of economical construction and adapted to many uses.

An important object of this invention is to provide a useful economical construction with a single type of construction unit furnishing all the essential parts of the structure, each unit being completely interchangeable with every other unit, and therefore easily nested for packing and transportation.

Another important object of the invention is to provide a structure capable of being repeatedly rapidly and easily assembled or taken apart; or, while in use, of being repaired, strengthened or altered.

Another important object of the invention is to provide a useful construction unit.

Another important object of this invention is to provide an improved inexpensive construction for such structures, with a maximum of unobstructed interior space.

Another important object of this invention is to make a portable, protective and defensive structure.

Another important object of the invention is to provide a structure capable of being adjusted or adapted to the ground where it is erected even though such ground does not offer continuous support.

An important object of this invention is to provide a structure which admits fresh air and permits the rapid escape of noxious and poisonous gases.

With the foregoing and other objects some of which will appear as the description proceeds, the invention resides in the shape of the unit piece and in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings which are not drawn to scale, like characters of reference indicate like parts in the several views. It is understood that the inventor does not limit himself to the proportions of the parts of the construction unit here illustrated, or to the number, type, or position of the perforations, slots or grooves appearing in the construction units in the drawings. Moreover, these illustrations do not by any means exhaust the possibilities of the variety of portable takedown structures to be made from the construction unit.

Figure 1 is an elevational view of the construction unit.

Figure 2 is an elevational view of the adjustable arch made from two construction units.

Figure 3 is a perspective elevational view of the construction unit showing the location of some of the perforations (part 5).

Figure 4 is a ground plan of a portable takedown structure, showing two joined adjustable horizontal arches. The dotted lines represent an additional and inverted adjustable arch buried beneath the ground.

Figures 5, 6, 7 and 8 are different views of a tent frame; Figure 5 showing an elevational end view of the closed end; Figure 6, an elevational end view of the open end; Figure 7, the roof plan of such a structure; and Figure 8, a side elevational view of the same structure. In Figure 8, the inverted arch 9 is shown, attached to the center of the framework, with dotted lines showing the head of the arch below the surface of the ground. One construction unit 1, is also indicated used as a tie strut.

Inverted adjustable arches may be placed at any point or points beneath the framework of the building and may be attached above the surface of the earth either to the horizontal adjustable arches or to the upright adjustable arches.

Figure 9 is a perspective sectional view of a corner of such a framework, showing an inverted construction unit attached to such end or corner, the dotted lines illustrating the part below the surface of the ground.

Figure 10 is a perspective end view of the open end of the structure, the dotted lines showing an adjustable inverted arch (part 9) beneath the surface of the ground.

Figure 11 is an elevational end view of the open end of the structure, illustrating a method of increasing the height of the framework by the use of inverted construction units, the dotted lines showing the parts below the surface of the earth.

Figure 12 is an elevational end view of a portable takedown structure, showing an opening in the framework to provide a doorway.

Figures 13, 14, 15, 16, 17, 18, and 20 show a variety of ways of joining the construction units together by part 3.

Figures 19, 20:
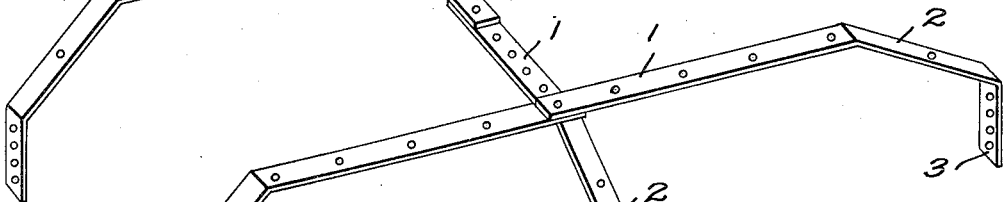

Figure 19 is a perspective view of a tent frame formed of three construction units joined through perforations with a bolt-like fastener, and a rope (part 8) drawn through some of the perforations in the units to support a fabric covering.

Figure 21:
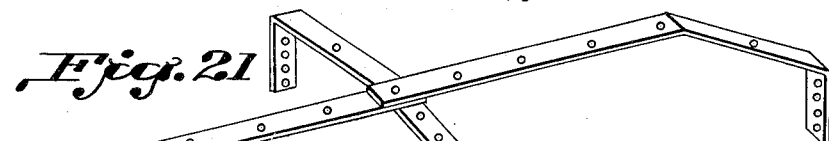

Figure 21 is a perspective view of six construction units fastened together to form the framework of a low extensive shelter.

Figure 22:
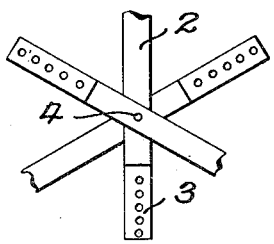

Figure 22 illustrates a method of forming a framework for a portable takedown structure by joining together parts 2 of three construction units.

Figure 23 is a perspective view of four construction units joined rigidly together at the top by part 3 to form the framework of a portable takedown structure or tent, and illustrating how wire or rope part 8 or other means may be embodied with the framework to hold a covering of fabric or other material in place.

Figure 24 is a side elevation of another variety of portable takedown structures differing from Figure 8 and adaptable to be set in the ground or to be the framework of a superstructure to be fastened on a vehicle or on any foundation.

Referring to the drawings in detail, the construction unit is composed of any appropriate material of sufficient resiliency, wood or metal being suitable, although I do not restrict myself to them in making the framework. Neither do I restrict myself to the use of a flat material although these illustrations represent structures made from a construction unit that is flat.

The basis of all the frameworks illustrated as well as of many frameworks not shown is the construction unit (Figures 1, 2 and 3). It resembles a semiarch in shape and is preferably made of three parts 1, 2 and 3 at angles to one another and containing a plurality of perforations (part 5).

Part 1 is usually the longest. It will be referred to as the leg as this is the part which—when the adjustable arch is in vertical position—rests on the ground. Part 2 is the middle section of the unit; and part 3 is the end or top section, and commonly but not necessarily the shortest section.

The angles B and C between parts 1 and 2, and 2 and 3 respectively may vary in size in different frameworks but are preferably not smaller than 90 degrees or larger than 180 degrees.

Figure 2 shows how two of these construction units may be joined together by a bolt-like fastener (part 4) through the perforations (part 5) in parts 3 to form an adjustable vertical arch.

It will be clear that if sections 1 and section 3 in each construction unit are at right angles to one another, this joining may be effected without an alteration in the sizes of angles B and C. However, commonly and preferably sections 1 and sections 3 in the construction units are not at right angles to one another. Then if legs 1 of the two construction units forming an arch are maintained parallel to and equidistant from one another, parts 3 cannot be joined into an arch without effecting a change in angles B and C in both construction units.

Legs 1 of the adjustable vertical arch are maintained in a parallel relationship to one another either by being thrust into the ground, or by being fastened to the legs of similar arches placed about such vertical arches in a horizontal position and used as cross bars.

Figure 4 shows two horizontal arches with their legs fastened to one another. Figure 8 illustrates the use of horizontal units as cross bars.

Horizontal arches placed about and fastened to the legs of vertical arches maintain the legs in any given vertical arch in a parallel position one to another.

By the same token, the vertical arches fastened to the horizontal arches maintain the legs of any given horizontal arch parallel to and equidistant from one another.

The material used being in some degree resilient, there is a constant tendency on the part of angles B and C in any given arch—horizontal or vertical—to resume the size they were originally in the separate construction units. This tendency, thwarted by the maintaining of the legs of every arch parallel to one another, produces throughout the structure a series of counteracting strains, an important and unique feature of this construction, and one which holds the various parts of the framework in tight engagement to one another.

Where it appears desirable, the structure may be further strengthened by the addition of an inverted vertical arch (part 9) as shown by the dotted lines in Figure 10. See also Figure 8. Parts 2 and 3 or the crown of such arch is buried beneath the ground to lend stability to the entire structure. The legs of this inverted arch are removably fastened to the legs of an upright vertical arch. Thus, the inclination of the legs of each to diverge from a parallel relationship so that angles B and C may resume their original size is prevented and the parallel relationship of the legs of each given arch is maintained.

The construction arches are referred to as adjustable arches for two reasons: first, because of the self adjustment already explained which must be made in the size of the angles when parts 3 of two construction units are joined and the legs 1 are maintained in parallel position to one another; and secondly, because parts 3 in the two construction units which form the adjustable arch need not overlap throughout their length as in Figure 2 but may extend only part way over one another if a different set of perforations (part 5) is used. This permits adjustment in the width of the arch and hence in the entire structure, as desired.

It is not necessary, but it is sometimes advantageous to employ part 6, shown in Figures 5, 7, and 8. Part 6 is the same as part 1 of the integral unit piece in shape and size and may be used as a cross bar.

Another use of the construction unit 1, 2, 3 is as a tie-strut 7 for the framework. Figure 8 serves to show how it may be fastened across the crowns of a series of vertical arches substantially like a ridge pole, extending downward at the end of the structure and secured to one of the horizontal arches. It may also be used as a tie-strut at the end of the structure by being fastened by leg 1 to the crowns of the horizontal arches at the closed end of the structure and to part 1 of a construction unit forming a ridge pole for the structure.

Figure 8 also shows the inverted arch (part 9) already mentioned. These inverted adjustable arches may be placed at any point or points beneath the framework of the building and may be attached above the surface of the ground either to the horizontal adjustable arches or to the upright adjustable arches.

Various of the other illustrations show the versatility of the construction unit. Figure 19 and Figure 23 show its use in the framework of two smaller tents in combination with 8, a rope which has been roved through the perforations in the unit pieces to support a fabric covering.

How two, three or four of these units may be joined together by bolt-like fasteners through perforations in their 3 parts is illustrated by Figures 13, 14, 15, 16, 17, 18, and 20. Of these Figures 13, 14, 15 and 18 show a method of putting the units together to form a rigid framework.

Figure 13:
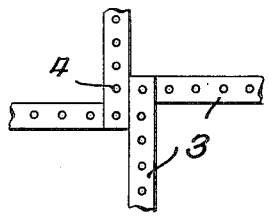
Figure 14:
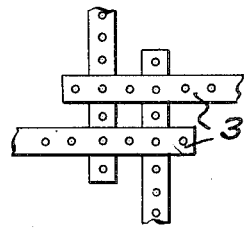
Figure 15:
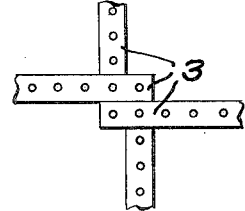
Figure 16:
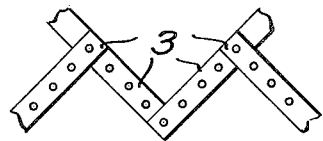
Figure 17:
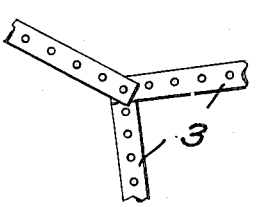
Figure 18:
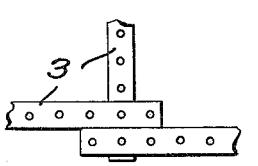

Figures 16, 17, and 20 depend upon the grip of the fastener. When that holds them fast, they form a rigid framework. They may, however, be used as a movable framework, Figure 16 illustrating a method of joining which is especially adapted for a movable extension. Figure 22 is intended to indicate that a similar fastening may be made through perforations in the part 2 of the units to form a different type of structure.

Figure 21 is illustrative of a use of the construction units to form the framework of a low shelter. If six construction units are joined in pairs through perforations in parts 1, and then two of the low arches thus formed are fastened at right angles through parts 1 to parts 1 of the third low arch, a framework is constructed adaptable for a plant cover or for other similar uses.

Figure 24 is an elevational view of a combination of joined units which illustrate a framework suitable for a superstructure, adaptable to be fastened to a trailer or a wagon or a building.

There are many other diverse uses to which the construction unit may be put. In combination with other similar units it is adaptable for the framework of a trellis, a cage, a coop, a kennel, an arbor, a construction toy, a small tent, a concession tent, a hanger, a garage, a play-yard, a packing case or container, a canopy, an awning, a plant covering, a boat, a boat cradle, a wagon top, a superstructure and other structures.

It will be seen that my invention obtains all of its intended objects and purposes in a highly efficient and convenient and economical manner.

It is obvious that changes may be made in the form and construction of the invention—such as by the addition of units or by a change in the degrees of the angles in the unit or by a change in the number of parts in the unit or by a change in the combination of materials or by a difference in the shape of the framework—without departing from the material spirit thereof. It is not, therefore, desired to confine the invention to the exact form or forms herein shown and described, but it is desired to include every form and variety of forms that come within the scope claimed.

Without restricting myself unessentially what I claim and desire to secure by Letters Patent is:

1. The frame of a portable take-down structure including an integral unit member, comprising a certain number of parts at given angles to one another and having a plurality of perforations and in shape resembling a semi arch.

2. A construction unit in shape resembling a semi arch and having a plurality of perforations and a certain number of elements at given angles to one another.

3. The frame of a portable take down structure including upright arches formed by the fastening together removably by means of fastening devices through perforations of pairs of integral unit members, each in shape resembling a semi arch and having a number of elements at given angles to one another and a plurality of perforations; the said fastening depressing the angles of the unit members when the end parts of such unit members are thrust vertically into the ground.

4. The frame of a portable take-down structure including upright arches formed by the fastening together removably with fastening devices through perforations of pairs of integral unit members, each in shape resembling a semi arch and having a certain number of parts at given angles to one another; the said fastening depressing the angles of the integral unit members and creating a downward and outward thrust along the end parts of the said upright arches since the said end parts are constrained into vertical position by horizontal arches constructed from integral unit members in the same manner as the said upright arches but placed substantially at right angles to the said upright arches and removably fastened to them; the said downward and outward thrust causing the end parts of the said upright arches to engage tightly with those of the said horizontal arches.

5. The frame of a portable take-down structure including inverted arches formed by removably fastening together with fastening devices through perforations pairs of integral unit members, each in shape resembling a semi-arch and having a plurality of perforations and a number of parts at given angles to one another, the end parts of said inverted arches being removably fastened to a superstructure, and the remainder of said inverted arches being buried beneath the ground, thereby forming a subterranean foundation for said superstructure.

6. The frame of a portable take-down structure including integral unit members each in shape resembling a semi-arch and having a plurality of perforations and a number of parts at given angles to one another, said members being inverted and removably fastened by their end parts to a superstructure and the remaining parts of said integral unit members being buried in the ground to form a subterranean foundation for said superstructure.

7. The frame of a portable take-down structure including upright arches formed by the fastening together-removably with fastening devices through perforations of pairs of integral unit members, each in shape resembling a semi-arch and having a certain number of parts at given angles to one another and a plurality of perforations; the said fastening depressing the angles of the integral unit members and creating a downward and outward thrust along the end parts of the said upright arches since the said end parts are constained into vertical position by horizontal arches constructed from integral unit members in the same manner as the said upright arches but placed substantially at right angles to the said upright arches and removably fastened to them; the said downward and outward thrust causing the end parts of the said upright arches to engage tightly with those of the said horizontal arches, thus making a stable framework in which every unit member of the whole construction is a facsimile of every other integral unit member.

8. The frame of a portable take-down structure including (a) a series of upright arches formed by removably fastening together with fastening devices through perforations pairs of integral unit members, each in shape resembling a semi-arch and having a plurality of perforations and a number of parts at given angles to one another; and (b) other similar integral upright unit members removably fastened to the end arch of the said series with the leg end of said similar integral unit members resting on the ground and (c) another similar integral unit member providing a tie strut for the structure and preventing any sway in the structure being removably fastened to the upright arches in the said series (a) as well as to an upright integral member (b) which is removably secured to the end arch of the said series.

9. The frame of a portable take-down structure including (a) a series of upright arches formed by removably fastening together with fastening devices through perforations pairs of integral unit members, each in shape resembling a semi-arch and having a plurality of perforations and a number of parts at given angles to one another; and (b) similar arches placed horizontally substantially at right angles to the upright arches and removably fastened to them and (c) an integral unit member used as a tie-strut and ridge pole which units the horizontal and the upright arches in a substantially rigid framework by being removably fastened to certain of the upright arches as well as to certain of the horizontally placed arches.

10. The frame of a portable take-down structure including integral unit members each resembling a semi arch and each in shape having elements at given angles to one another and a plurality of perforations, the shape of each of the said unit members being such that it is easily and conveniently nested with every other member.

11. The frame of a portable take-down structure including an adjustable arch formed by fastening together with fastening devices through perforations two integral unit members, each in shape resembling a semi arch and having a certain number of parts at given angles to one another and a plurality of perforations, the size of the arch varying with the degree that the said integral unit members overlap one another and the various perforations through which the fastening devices are fastened.

LEWIS A. DOWD.